United States Patent
Herchen et al.

(10) Patent No.: US 7,497,026 B2
(45) Date of Patent: Mar. 3, 2009

(54) METHOD AND SYSTEM FOR DETECTION OF WAFER CENTERING IN A TRACK LITHOGRAPHY TOOL

(75) Inventors: Harald Herchen, Los Altos, CA (US); Lily Pang, Fremont, CA (US); Erica Porras, Los Gatos, CA (US)

(73) Assignee: Sokudo Co., Ltd., Kyoto (JP)

( * ) Notice: Subject to any disclaimer, the term of this patent is extended or adjusted under 35 U.S.C. 154(b) by 69 days.

(21) Appl. No.: 11/763,352

(22) Filed: Jun. 14, 2007

(65) Prior Publication Data

US 2008/0168673 A1  Jul. 17, 2008

Related U.S. Application Data

(60) Provisional application No. 60/884,587, filed on Jan. 11, 2007.

(51) Int. Cl.
*H01L 21/00* (2006.01)
*G01B 9/00* (2006.01)

(52) U.S. Cl. .......... 33/550; 33/520; 250/492.2; 438/16

(58) Field of Classification Search .......... 33/550, 33/613, 645, 520, 644; 250/492.2; 430/311; 438/16
See application file for complete search history.

(56) References Cited

U.S. PATENT DOCUMENTS

| | | | |
|---|---|---|---|
| 4,902,971 A | | 2/1990 | Guzik et al. |
| 5,271,796 A | * | 12/1993 | Miyashita et al. ............ 438/16 |
| 5,365,672 A | * | 11/1994 | Kato ............................ 33/520 |
| 5,822,213 A | * | 10/1998 | Huynh ........................ 700/213 |
| 6,327,025 B1 | * | 12/2001 | Imai ............................ 355/53 |
| 6,545,752 B1 | * | 4/2003 | Swan et al. ................. 356/237.4 |
| 6,566,654 B1 | * | 5/2003 | Funatsu et al. .............. 250/310 |
| 7,098,085 B2 | | 8/2006 | Yamanaka et al. |
| 7,357,842 B2 | | 4/2008 | Ishikawa et al. |
| 2005/0186483 A1 | * | 8/2005 | Schoonewelle et al. ........ 430/4 |
| 2006/0130747 A1 | | 6/2006 | Ishikawa et al. |
| 2006/0182536 A1 | | 8/2006 | Rice et al. |
| 2006/0216840 A1 | * | 9/2006 | Blomiley et al. ............ 438/16 |
| 2006/0292714 A1 | | 12/2006 | Kim |
| 2008/0010845 A1 | * | 1/2008 | Bailey et al. ................. 33/520 |

OTHER PUBLICATIONS

International Search Report and Written Opinion of PCT Application No. PCT/US08/50284, dated May 9, 2008.

* cited by examiner

*Primary Examiner*—Christopher W Fulton
(74) *Attorney, Agent, or Firm*—Townsend and Townsend and Crew LLP

(57) ABSTRACT

A system for measuring substrate concentricity includes a substrate support member adapted to rotate a substrate around a substantially vertical axis. The substrate includes a mounting surface and a process surface. The system also includes a spin cup positioned below the substrate and a translatable arm mounted a predetermined distance above the process surface of the substrate. The translatable arm is adapted to translate along a radius of the substrate. The system further includes an optical emitter mounted on the translatable arm and an optical detector mounted on the translatable arm.

18 Claims, 9 Drawing Sheets

METHOD AND SYSTEM FOR DETECTION OF WAFER CENTERING IN A TRACK LITHOGRAPHY TOOL

CROSS-REFERENCES TO RELATED APPLICATIONS

The present application claims benefit under 35 U.S.C. § 119(e) of U.S. Provisional Patent Application No. 60/884,587, filed Jan. 11, 2007, entitled "Method and System for Detection of Wafer Centering in a Track Lithography Tool," which is incorporated herein by reference in its entirety.

BACKGROUND OF THE INVENTION

The present invention relates generally to the field of substrate processing equipment. More particularly, the present invention relates to a method and apparatus for detecting wafer centering during operation of a semiconductor processing apparatus. Merely by way of example, the method and apparatus of the present invention have been applied to the use of an optical emitter and emitter mounted on a translatable stage to determine wafer position during wafer rotation in a process chamber of a track lithography tool. The method and apparatus can be applied to other processing devices for semiconductor processing equipment utilized in other processing chambers.

Modern integrated circuits contain millions of individual elements that are formed by patterning the materials, such as silicon, metal and dielectric layers, that make up the integrated circuit to sizes that are small fractions of a micrometer. The technique used throughout the industry for forming such patterns is photolithography. A typical photolithography process sequence generally includes depositing one or more uniform photoresist (resist) layers on the surface of a substrate, drying and curing the deposited layers, patterning the substrate by exposing the photoresist layer to radiation that is suitable for modifying the exposed layer and then developing the patterned photoresist layer.

It is common in the semiconductor industry for many of the steps associated with the photolithography process to be performed in a multi-chamber processing system (e.g., a cluster tool) that has the capability to sequentially process semiconductor wafers in a controlled manner. One example of a cluster tool that is used to deposit (i.e., coat) and develop a photoresist material is commonly referred to as a track lithography tool.

Track lithography tools typically include a mainframe that houses multiple chambers (which are sometimes referred to herein as stations) dedicated to performing the various tasks associated with pre- and post-lithography processing. There are typically both wet and dry processing chambers within track lithography tools. Wet chambers include coat and/or develop bowls, while dry chambers include thermal control units that house bake and/or chill plates. Track lithography tools also frequently include one or more pod/cassette mounting devices, such as an industry standard FOUP (front opening unified pod), to receive substrates from and return substrates to the clean room, multiple substrate transfer robots to transfer substrates between the various stations of the track tool and an interface that allows the tool to be operatively coupled to a lithography exposure tool in order to transfer substrates into the exposure tool and to receive substrates after they have been processed within the exposure tool.

Over the years there has been a strong push within the semiconductor industry to shrink the size of semiconductor devices. The reduced feature sizes have caused the industry's tolerance to process variability to shrink, which in turn, has resulted in semiconductor manufacturing specifications having more stringent requirements for process uniformity and repeatability. An important factor in minimizing process variability during track lithography processing sequences is to ensure that substrate or wafer is properly centered during the performance of processing steps. During semiconductor device processing, it is preferable to accurately center the wafer on a support platform or chuck in order to ensure the wafer will receive uniform processing across its entire process surface (e.g., uniform photoresist layers during photoresist spin processes). In addition, for processes sensitive to crystal orientation or pattern alignment, wafers are generally provided with a notch or flat to signify the substrate's crystal orientation or pattern alignment. During processing steps, alignment of the wafer using the notch or flat is performed to place the notch or flat in the appropriate location with respect to the chamber components.

Wafer centering devices exist in which an optical emitter and an optical detector are placed on opposite sides of the wafer and light passing around the outer edge of the wafer is measured at the optical detector. The accuracy with which the wafer is centered on the chuck is then determined. However, in some track lithography tool applications, such wafer centering designs are not practical due to the use of fluids such as photoresist, which can result in unwanted contact between the optical elements and the processing fluids.

Thus, there is a need in the art for improved methods and systems for detecting wafer centering during track lithography tool operations.

SUMMARY OF THE INVENTION

According to an embodiment of the present invention, a system for measuring substrate concentricity is provided. The system includes a substrate support member adapted to rotate a substrate around a substantially vertical axis. The substrate includes a mounting surface and a process surface. The system also includes a spin cup positioned below the substrate and a translatable arm mounted a predetermined distance above the process surface of the substrate. The translatable arm is adapted to translate along a radius of the substrate. The system further includes an optical emitter mounted on the translatable arm and an optical detector mounted on the translatable arm. In a particular embodiment, the optical emitter is oriented to direct an incident beam of optical radiation at a non-normal angle of incidence with respect to the process surface of the substrate.

According to another embodiment of the present invention, a method of measuring substrate concentricity is provided. The method includes placing the substrate on a substrate support positioned above a spin cup, rotating the substrate, and directing an incident beam of optical radiation to impinge on a process surface of the substrate. The method also includes detecting a first reflected beam that is reflected off of the spin cup and detecting a second reflected beam that is reflected off of the process surface of the substrate. The method further includes computing the substrate concentricity. In some embodiments, a trigonometric analysis is performed as part of the process of computing the substrate concentricity.

According to a specific embodiment, a method of measuring substrate concentricity is provided. The method includes a) rotating the substrate, b) providing a beam of incident light from an optical emitter, and c) directing the beam of incident light at a process surface of the substrate. The method also includes d) collecting a series of signal values at an optical detector, e) translating the optical emitter toward a center of the substrate, and f) translating the optical detector toward the center of the substrate. The method further includes g) repeating steps d) through f) a predetermined number of times to provide a set of the series of signal values, h) curve fitting the set of the series of signal values to a set of curves to provide a set of fitted curves, i) selecting an amplitude value associated with two of the set of fitted curves, and j) performing an analysis to determine the substrate concentricity. In an embodiment, the analysis to determine the substrate concentricity includes performing a trigonometric analysis.

Many benefits are achieved by way of the present invention over conventional techniques. For example, embodiments of the present invention provide systems to measure wafer centering that are resistant to contamination from photolithography chemicals. Moreover, embodiments are characterized by a smaller form factor than conventional systems since the optical head extends to a reduced height above the process surface of the substrate. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
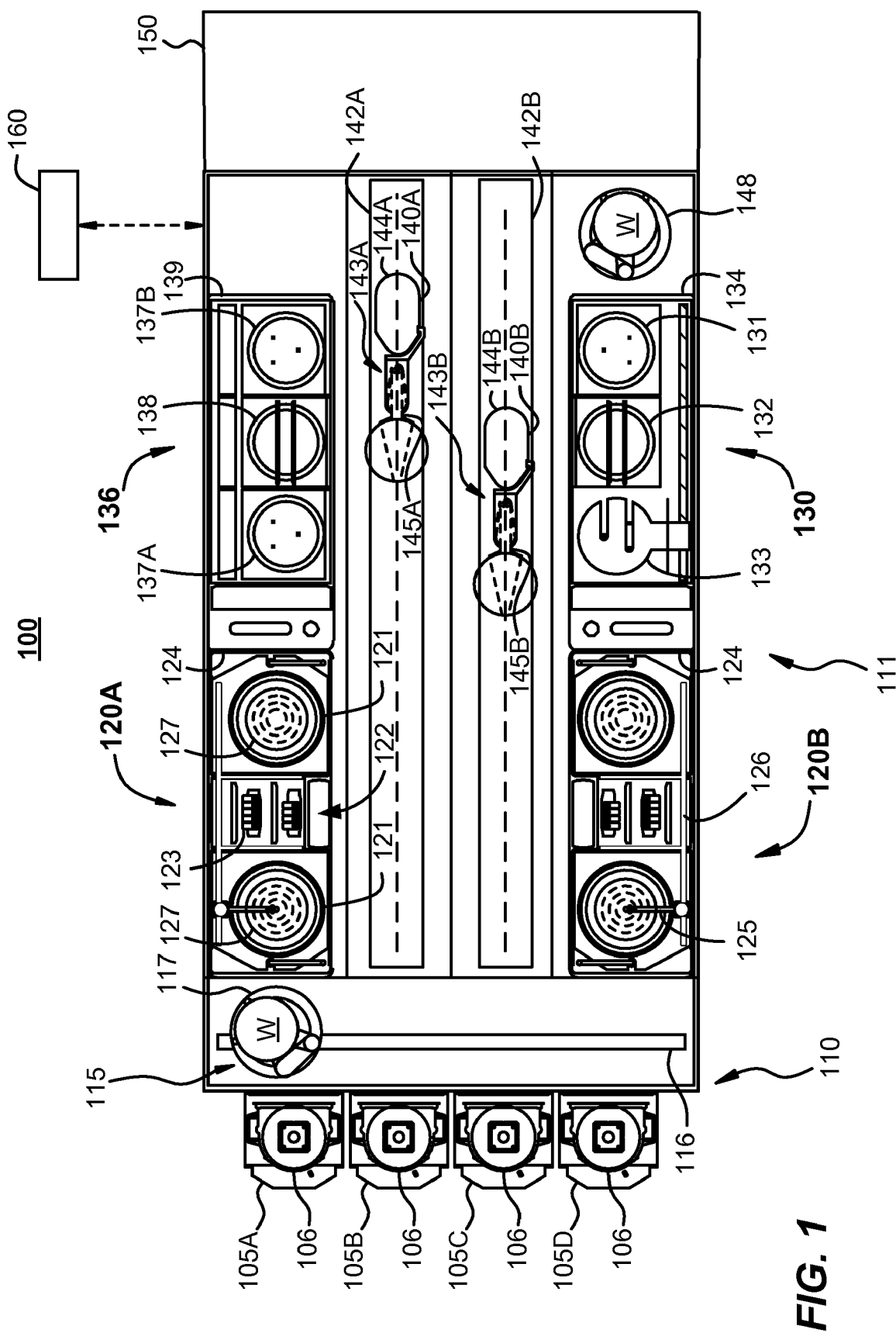
FIG. 1 is a simplified plan view of a track lithography tool according to an embodiment of the present invention.

FIG. 1 is a plan view of an embodiment of a track lithography tool in which the embodiments of the present invention may be used. As illustrated in FIG. 1, the track lithography tool contains a front end module 110 (sometimes referred to as a factory interface) and a process module 111. In other embodiments, the track lithography tool includes a rear module (not shown), which is sometimes referred to as a scanner interface. Front end module 110 generally contains one or more pod assemblies or FOUPS (e.g., items 105A-D) and a front end robot assembly 115 including a horizontal motion assembly 116 and a front end robot 117. The front end module 110 may also include front end processing racks (not shown). The one or more pod assemblies 105A-D are generally adapted to accept one or more cassettes 106 that may contain one or more substrates or wafers that are to be processed in the track lithography tool. The front end module 110 may also contain one or more pass-through positions (not shown) to link the front end module 110 and the process module 111.

Process module 111 generally contains a number of processing racks 120A, 120B, 130, and 136. As illustrated in FIG. 1, processing racks 120A and 120B each include a coater/developer module with shared dispense 124. A coater/developer module with shared dispense 124 includes two coat bowls 121 positioned on opposing sides of a shared dispense bank 122, which contains a number of dispense nozzles 123 providing processing fluids (e.g., bottom anti-reflection coating (BARC) liquid, resist, developer, and the like) to a wafer mounted on a substrate support 127 located in the coat bowl 121. In the embodiment illustrated in FIG. 1, a nozzle positioning member 125 sliding along a track 126 is able to pick up a dispense nozzle 123 from the shared dispense bank 122 and position the selected dispense nozzle over the wafer for dispense operations. Coat bowls with dedicated dispense banks are provided in alternative embodiments.

Processing rack 130 includes an integrated thermal unit 134 including a bake plate 131, a chill plate 132 and a shuttle 133. The bake plate 131 and the chill plate 132 are utilized in heat treatment operations including post exposure bake (PEB), post-resist bake, and the like. In some embodiments the shuttle 133, which moves wafers in the x-direction between the bake plate 131 and the chill plate 132, is chilled to provide for initial cooling of a wafer after removal from the bake plate 131 and prior to placement on the chill plate 132. Moreover, in other embodiments shuttle 133 is adapted to move in the z-direction, enabling the use of bake and chill plates at different z-heights. Processing rack 136 includes an integrated bake and chill unit 139, with two bake plates 137A and 137B served by a single chill plate 138.

One or more robot assemblies (robots) 140 are adapted to access the front-end module 110, the various processing modules or chambers retained in the processing racks 120A, 120B, 130, and 136, and the scanner 150. By transferring substrates between these various components, a desired processing sequence can be performed on the substrates. The two robots 140 illustrated in FIG. 1 are configured in a parallel processing configuration and travel in the x-direction along horizontal motion assembly 142. Utilizing a mast structure (not shown), the robots 140 are also adapted to move orthogonal to the transfer direction. Utilizing one or more of three directional motion capabilities, robots 140 are able to place wafers in and transfer wafers between the various processing chambers retained in the processing racks that are aligned along the transfer direction.

Referring to FIG. 1, the first robot assembly 140A and the second robot assembly 140B are adapted to transfer substrates to the various processing chambers contained in the processing racks 120A, 120B, 130, and 136. In one embodiment, to perform the process of transferring substrates in the track lithography tool, robot assembly 140A and robot assembly 140B are similarly configured and include at least one horizontal motion assembly 142, a vertical motion assembly 144, and a robot hardware assembly 143 supporting a robot blade 145. Robot assemblies 140 are in communication with a controller 160 that controls the system. In the embodiment illustrated in FIG. 1, a rear robot assembly 148 is also provided.

The scanner 150 is a lithographic projection apparatus used, for example, in the manufacture of integrated circuits. The scanner 150 exposes a photosensitive material that was deposited on the substrate in the cluster tool to some form of radiation to generate a circuit pattern corresponding to an individual layer of the integrated circuit device to be formed on the substrate surface.

Each of the processing racks 120A, 120B, 130, and 136 contain multiple processing modules in a vertically stacked arrangement. That is, each of the processing racks may contain multiple stacked coater/developer modules with shared dispense 124, multiple stacked integrated thermal units 134, multiple stacked integrated bake and chill units 139, or other modules that are adapted to perform the various processing steps required of a track photolithography tool. As examples, coater/developer modules with shared dispense 124 may be used to deposit a bottom antireflective coating (BARC) and/or deposit and/or develop photoresist layers. Integrated thermal units 134 and integrated bake and chill units 139 may perform bake and chill operations associated with hardening BARC and/or photoresist layers after application or exposure.

In one embodiment, controller 160 is used to control all of the components and processes performed in the cluster tool. The controller 160 is generally adapted to communicate with the scanner 150, monitor and control aspects of the processes performed in the cluster tool, and is adapted to control all aspects of the complete substrate processing sequence. The controller 160, which is typically a microprocessor-based controller, is configured to receive inputs from a user and/or various sensors in one of the processing chambers and appropriately control the processing chamber components in accordance with the various inputs and software instructions retained in the controller's memory. The controller 160 generally contains memory and a CPU (not shown) which are utilized by the controller to retain various programs, process the programs, and execute the programs when necessary. The memory (not shown) is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits (not shown) are also connected to the CPU for supporting the processor in a conventional manner. The support circuits may include cache, power supplies, clock circuits, input/output circuitry, subsystems, and the like all well known in the art. A program (or computer instructions) readable by the controller 160 determines which tasks are performable in the processing chambers. Preferably, the program is software readable by the controller 160 and includes instructions to monitor and control the process based on defined rules and input data.

It is to be understood that embodiments of the invention are not limited to use with a track lithography tool such as that depicted in FIG. 1, but may be used in any track lithography tool including the many different tool configurations described in U.S. patent application Ser. Nos. 11/112,281 entitled "Cluster Tool Architecture for Processing a Substrate" filed on Apr. 22, 2005, and 11/315,984 entitled "Cartesian Robot Cluster Tool Architecture" filed on Dec. 22, 2005, both of which are hereby incorporated by reference for all purposes. In addition, embodiments of the invention may be used in other semiconductor processing equipment.

Figure 2:
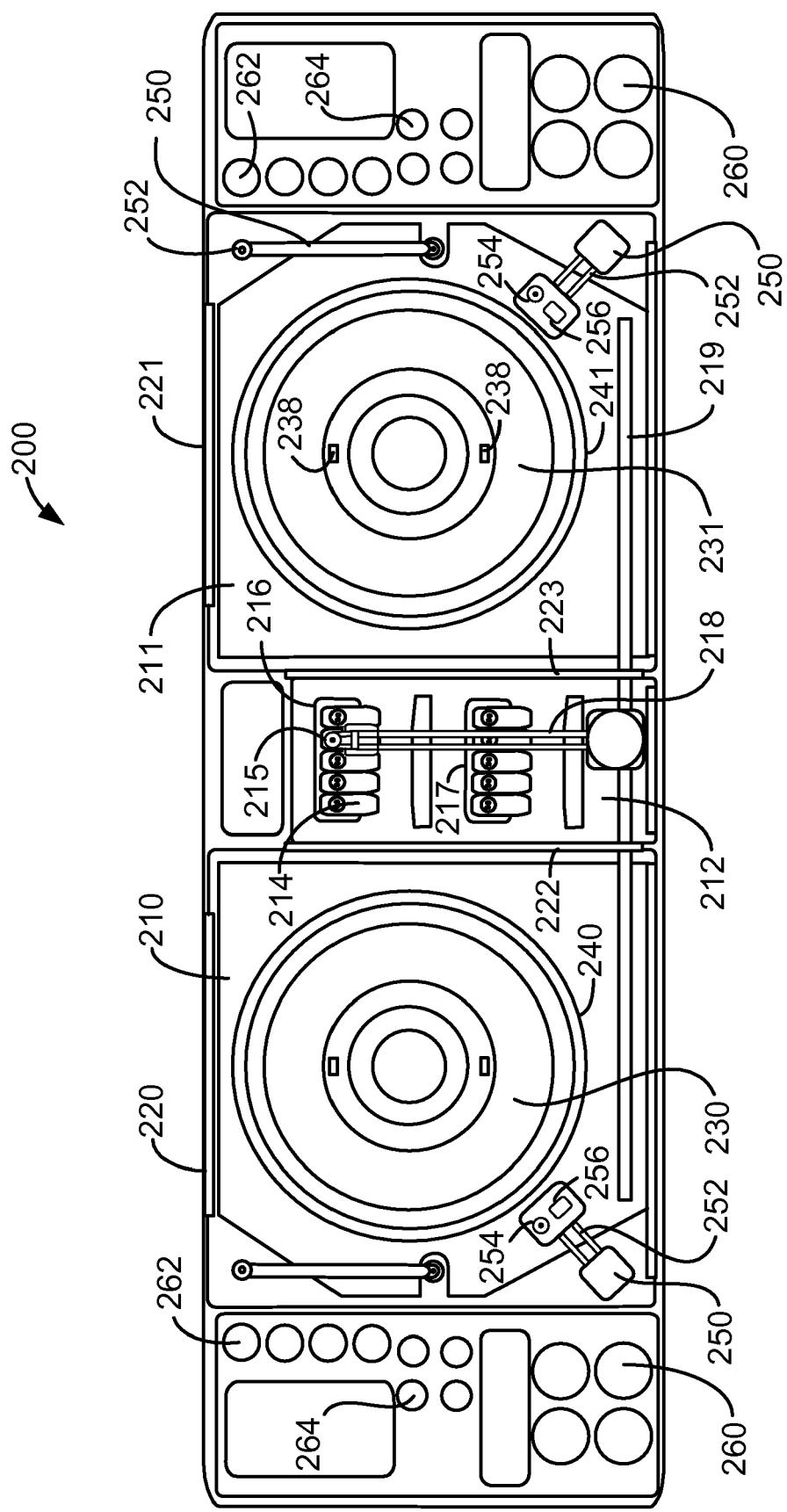
FIG. 2 is a simplified schematic plan view of a fluid dispensing apparatus according to one embodiment of the present invention.

FIG. 2 is a simplified schematic plan view of a fluid dispensing apparatus according to one embodiment of the present invention. Although two chambers suitable for dispensing photoresist or other fluids are illustrated in FIG. 2, this twin-bowl arrangement is not required by the present invention. Additional description of chambers appropriate for employing embodiments of the present invention is provided in U.S. patent application Ser. No. 11/111,353, filed on Apr. 20, 2005, which is commonly assigned and hereby incorporated by reference in its entirety for all purposes. Referring to FIG. 2, the cups 240 and 241 are manufactured from a material characterized by suitable rigidity and solvent-resistance. For example in some embodiments of the present invention, cups 240 and 241 are manufactured from a plastic material (e.g., Polytetrafluoroethylene (PTFE), perfluoroalkoxy (PFA), polypropylene, or Polyvinylidene fluoride (PVDF)), a ceramic material, a metal coated with a plastic material (e.g., aluminum or SST coated with either PVDF, Halar, etc.), or other materials that are compatible with the processing fluids delivered from the fluid dispense system 212.

A lift assembly (not shown) generally contains an actuator (not shown), such as an air cylinder or servomotor, and a guide (not shown), such as a linear ball bearing slide, which are adapted to raise and lower the rotatable spin chucks 230 and 231 to a desired position. The lift assembly is thus adapted to position the substrate mounted on the rotatable spin chucks in the cups during processing and also lift the substrate above the top of the cup to exchange the substrate with an external robot positioned outside the enclosure 200. A robot blade (not shown), which is attached to the external robot, enters the apparatus 200 through the robot access shutters 220 and 221.

As illustrated in FIG. 2, a pre-wet nozzle 215 is located at a distal end of extension arm assembly 218. As described more fully below, the extension arm is a telescoping arm, thus capable of controllably positioning the pre-wet nozzle 215 a desired distance from the guide mechanism 219. Furthermore, backside rinse (BSR) nozzles 238 are included on a portion of the bowl situated below a substrate positioned on the spin chucks 230 and 231. The BSR nozzles provide a solvent applied to the backside of the substrate during a cleaning step. In one embodiment, an edge bead removal (EBR) arm 250 is provided at a corner of each processing chamber. As illustrate in FIG. 2, the EBR arm rotates around a pivot 252 located at a proximal end of the EBR arm to position a distal end of the EBR arm at a position over an edge of a substrate mounted on the spin chuck. An EBR fluid is dispensed through a nozzle located at the distal end of the EBR arm to remove an edge bead present on the substrate.

A gas flow distribution system is adapted to deliver a uniform flow of a gas through the enclosure 200 and processing chambers 210 and 211. In a specific embodiment the gas flow distribution system provides temperature and/or humidity controlled air through supply ports 260. Cup exhausts 262 provide for removal of air from the processing chamber. Cup drains 264 provide for removal of fluids from the cups. As illustrated in FIG. 2, four ports are shown in relation to the temperature and/or humidity controlled air, the cup exhausts, and the cup drains. This illustration is provided because, in some embodiments, four dispense systems are vertically stacked to reduce system footprint. Thus, for example, each of the illustrated cup exhausts is coupled to a cup in one of the four dispense systems.

Each of the two chambers also includes a robot access shutter 220/221 to alternately provide a seal for an access port and provide access for a robot arm to pass through the access port. When a substrate is ready to be processed and the processing chamber is available to process the substrate, the robot access shutter is opened. A robot arm (not shown), on which the substrate is supported, is moved through the access port to move the substrate from a position outside the processing chamber to a position over one of the spin chucks. Utilizing methods well known to one of skill in the art, the robot arm places the substrate on the spin chuck, exits the processing chamber, and the robot access shutter is closed.

As illustrated in FIG. 2, each of the two processing chambers also include a dispense arm access shutter 222 and 223 positioned between the spin chucks 230 and 231, respectively, and the central fluid dispense bank 212. In some embodiments, the dispense arm access shutters provide a shield to isolate the processing chambers from the central fluid dispense bank during operation of the system. In general, coat processes include accelerating the substrate to a desired spin rate, dispensing the coating fluid, e.g., photoresist, for several seconds, and continue spinning the substrate for tens of seconds. Merely by way of example, in one embodiment of the present invention, the substrate is spun up until a rate of 500 RPMs is reached, photoresist is dispensed for about 3 seconds, and the substrate is maintained at a spin rate of 1,800 RPMs for about 60 seconds.

The central fluid dispense bank 212 contains a plurality of nozzles 214 that are contained in one or more nozzle holder assemblies 216. As described more fully in U.S. patent application Ser. No. 11/112,281, filed on Apr. 22, 2005, the fluid dispense system used in the coater or developer modules may contain one or more fluid source assemblies (not shown) which deliver one or more processing fluids to the surface of a substrate mounted on the spin chuck 230. In some embodiments of the present invention, the home position of the dispense arm is in the central fluid dispense bank region. Thus, during substrate loading and unloading operations through robot access doors 220 and 221, the dispense arm is located at the home position in the central fluid dispense bank region.

As illustrated in FIG. 2, two dispense nozzle banks are provided in one embodiment of the present invention. Each nozzle 214, contained in the nozzle holder assemblies 216, is typically connected to plumbing components (including a supply tube, a pump, a filter, a suck back valve, a fluid source, and the like) and is adapted to dispense a single type of processing fluid. In a particular embodiment, the processing fluid is a photoresist, a solvent, a coating, a developer, or the like. One of ordinary skill in the art would recognize many variations, modifications, and alternatives. As the dispense arm is able to be positioned in either the left or right processing chambers, each central fluid dispense bank can serve both processing chambers, thus reducing the redundancy required in each processing chamber.

Generally, resist nozzles are adapted to dispense a variety of chemicals, including resist, antireflection coatings, and spin on materials (e.g., SOG and SOD). A develop nozzle bank, on the other hand, typically includes between one and three nozzles. In some embodiments, more than three develop nozzles are included in a develop nozzle bank. Additionally, some develop nozzle banks include a number of rinse lines as appropriate to the particular application.

Wafer centering detection components include a base 250, moveable extension arms 252, optical emitter 254, and optical detector 256. As described more fully below, the optical emitter 254 and the optical detector 256 are referred to as an optical head, which is translated on the moveable extension arms along a radius of the substrate supported above the spin cups 240 and 241. In some embodiments, the moveable extension arms are referred to as a translatable extension arm. Although the optical emitter 254 and the optical detector 256 are illustrated as positioned along an arc a fixed radial distance from the center of the substrate, this is not required by embodiments of the present invention. In some embodiments, the optical emitter 254 and optical detector 256 are positioned at different radial distances. One of ordinary skill in the art would recognize many variations, modifications, and alternatives.

Although the moveable or translatable extension arms 252 is shown as a separate component of the chamber, this is not required by the present invention. In some alternative embodiments, the optical emitter 254 and optical detector 256 are mounted on other moveable components, including the dispense arm 218.

Figure 3:
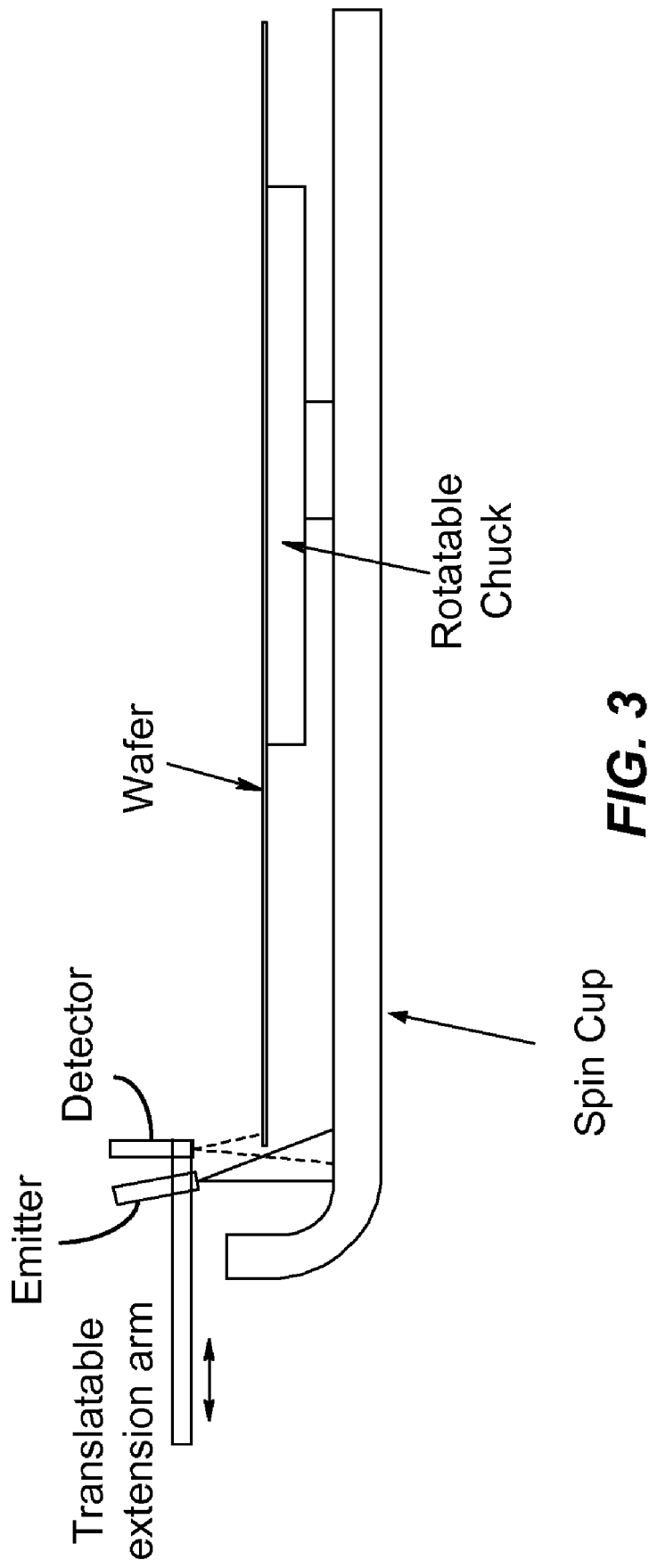
FIG. 3 is a simplified side view of components of a wafer centering detection system according to an embodiment of the present invention.

FIG. 3 is a simplified side view of components of a wafer centering detection system according to an embodiment of the present invention. A wafer to be processed, for example, in a photoresist coating chamber, is supported on a rotatable chuck. During photoresist processing, the wafer is positioned within the spin cup as illustrated in FIG. 3. By measuring the concentricity with the spin axis of the chuck, measurements are made at the processing location, which is preferable, although not required. For purposes of simplicity, portions of the chamber and various components are not shown. One of ordinary skill in the art would recognize many variations, modifications, and alternatives. An optical emitter and an optical detector that are part of an optical head are mounted on the moveable or translatable extension arm. In an embodiment, the translatable extension arm is adapted to translate in the plane of the wafer along a radius of the wafer, moving over portions of the wafer or to positions adjacent the wafer as illustrated in FIG. 2.

Referring to FIG. 3, in contrast with some conventional designs, the optical emitter and detector (also referred to as a sensor or receiver) are mounted on the same side of the wafer (i.e., the process surface of the wafer). The signal received at the detector is a function of the position of the optical head with respect to the wafer, enabling the detection of the wafer edge. In contrast with designs in which the emitter or detector is mounted on the underside of the wafer, embodiments described herein locate both components above the wafer surface, preventing contamination by fluids, particles, and the like. Moreover, embodiments of the present invention provide centering detection solutions in applications for which is it not possible to mount either the emitter or detector on the underside of the wafer.

Although a single optical emitter and detector are illustrated in FIG. 3, this is not required by the present invention. In other embodiments, multiple emitters and/or detectors or combinations of single/multiple emitters/detectors are employed. As illustrated in FIG. 3, the beams are oriented such that the emitting beam shines light down and towards the wafer, but at a slight angle so that the emitted light covers the area below the edge of the wafer. As a result, when the emitter/detector unit is at a radial distance from the wafer center greater than the wafer radius, light reflected from the spin cup is at least partially received at the detector, as the reflected light is only partially blocked by the wafer. In many conventional designs, the sensors are offset neither linearly nor angularly. One of the advantages provided herein is that the angular and linear displacement from the conventional approach enables emitted light to pass by the edge of the wafer and be reflected from the spin cup when the emitter is near the wafer edge. Accordingly, it is possible to detect the fact that light is at least partially blocked by the edge of the wafer. Since the sensor is mounted above the wafer, the height of the optical components of the sensing unit is reduced in comparison with conventional designs.

In some designs, the lowermost portion of the sensor is mounted so that it is able to clear the bowl edge. Generally, the bowl edge height above the wafer is selected to lie in a range based on air flow considerations on the upper end of the range and on containing the spray on the lower end of the range. Thus, a particular embodiment mounts the sensor so that a distance between the sensor and the upper surface of the substrate is between about 3 mm and about 40 mm. In a specific embodiment, the sensor is positioned 22 mm above the wafer surface. As will be evident to one of skill in the art, the greater the separation between the wafer and the sensor, the lower the detected signal levels.

Figure 4:
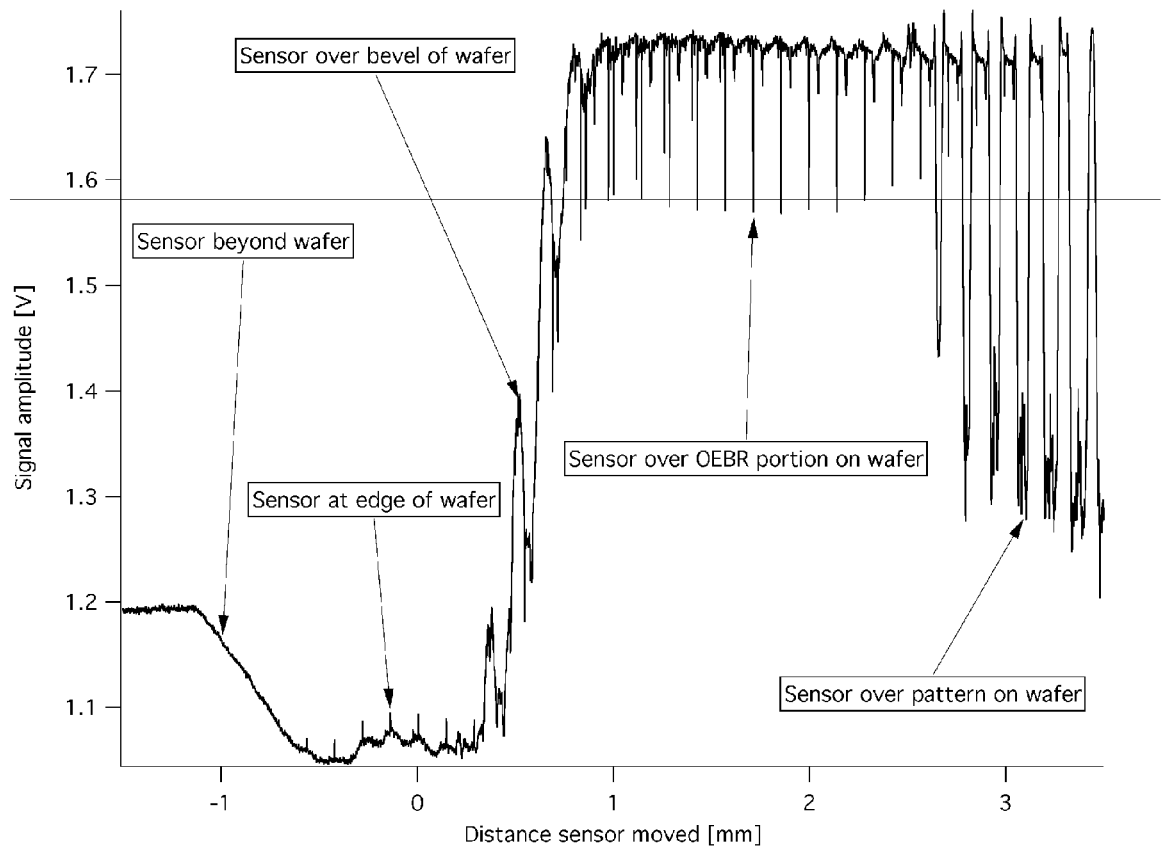
FIG. 4 is a plot of detected intensity as a function of time obtained using an embodiment of the present invention.

FIG. 4 is a plot of detected intensity as a function of time obtained using an embodiment of the present invention. To collect the data illustrated in FIG. 4, the detector was moved radially inward at a constant speed over a distance of several millimeters. The wafer was rotated at an angular speed resulting in approximately seven rotations per millimeter of sensor travel. The light incident on the detector was measured and is represented by the signal amplitude in volts. As will be described below, the wafer was not properly centered during the measurements illustrated in FIG. 4. Moreover, wafer was patterned with an off-center patterning on its top surface during the illustrated measurement.

Analyzing the data presented in FIG. 4, the position of the optical head including the detector with respect to the wafer and the accuracy with which the wafer is centered may be determined. Several regions or conditions are illustrated in FIG. 4.

Optical Head Off Wafer

At sensors positions less than −1 mm, the detector or sensor is at a radial distance from the wafer center greater than the wafer radius. Accordingly, the detected signal results solely from reflection of light off the spin cup. Despite small concentricity errors, the distance from the wafer center to the emitter/detector is such that emitted light does not reflect off the wafer surface.

Optical Head at Wafer Edge

Figure 5:
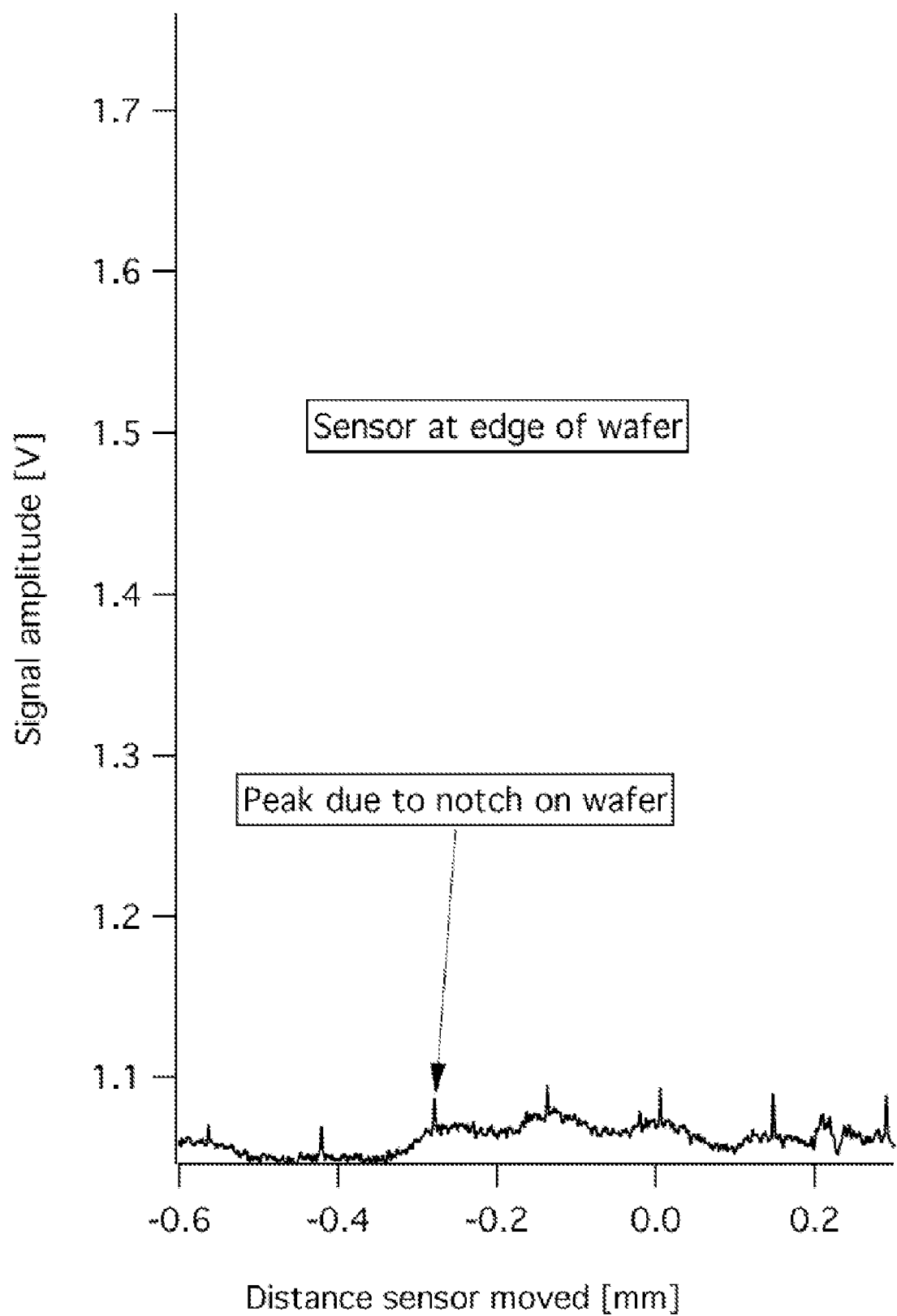
FIG. 5 is a first expanded portion of the data presented in FIG. 4.

As the detector is moved toward the wafer center, the detector approaches the wafer edge. A majority of the detected light is reflected from the spin cup, with some light reflected from the wafer surface. FIG. 5 is a first expanded portion of the data presented in FIG. 4. Referring to FIG. 5, the predominate signal results from light reflected off the spin cup, however, local peaks in intensity are also observed. These peaks (e.g., peaks at about −0.42, −0.3, −0.15, and 0.0), are associated with light that passes by the edge of the wafer through the wafer notch, is reflected off the spin cup, and returns to the detector. Thus, the increase in measured light intensity as the wafer notch passes the detector demonstrates that the signal is predominately due to light reflected from the spin cup below the wafer. The notch can be considered a small, intermittent window, in which additional light reflected from below the wafer is detected.

As discussed throughout the present specification, methods and systems provided herein detect the edge of the substrate, not the top of the bevel. The light passing through the notch after reflection off the bottom of the spin cup provides a signal used in detecting the wafer edge. By detecting the light passing through the notch after reflection off the spin cup and comparing this light to the light blocked by the edge of the wafer, embodiments are able to determine the location of the edge of the wafer, not just the bevel. As the sensor is translated further inwards, eventually the reflection from the top of the wafer is stronger than the reflection from the bottom of the bowl, in part because the reflection from the bottom is largely blocked. Accordingly, the algorithm is adapted to stop using detected data that is too bright, which is correlated with reflection from the top of the wafer.

Optical Head Over Wafer Bevel

Referring once again to FIG. 4, as the detector is moved so that the distance to the wafer center continues to decrease, the detector approaches the wafer edge and the contribution of light reflected from the upper surface of the wafer to the detected signal begins to grow. At a distance of about 0.4 mm as illustrated in FIG. 4, the detected signal begins to increase as the off-center wafer alternatively reflects light off the wafer surface ad then allows light to pass during the rotation cycle. Accordingly, the label "Sensor over bevel of wafer" is illustrated in FIG. 4.

Optical Head Over Wafer

Figure 6:
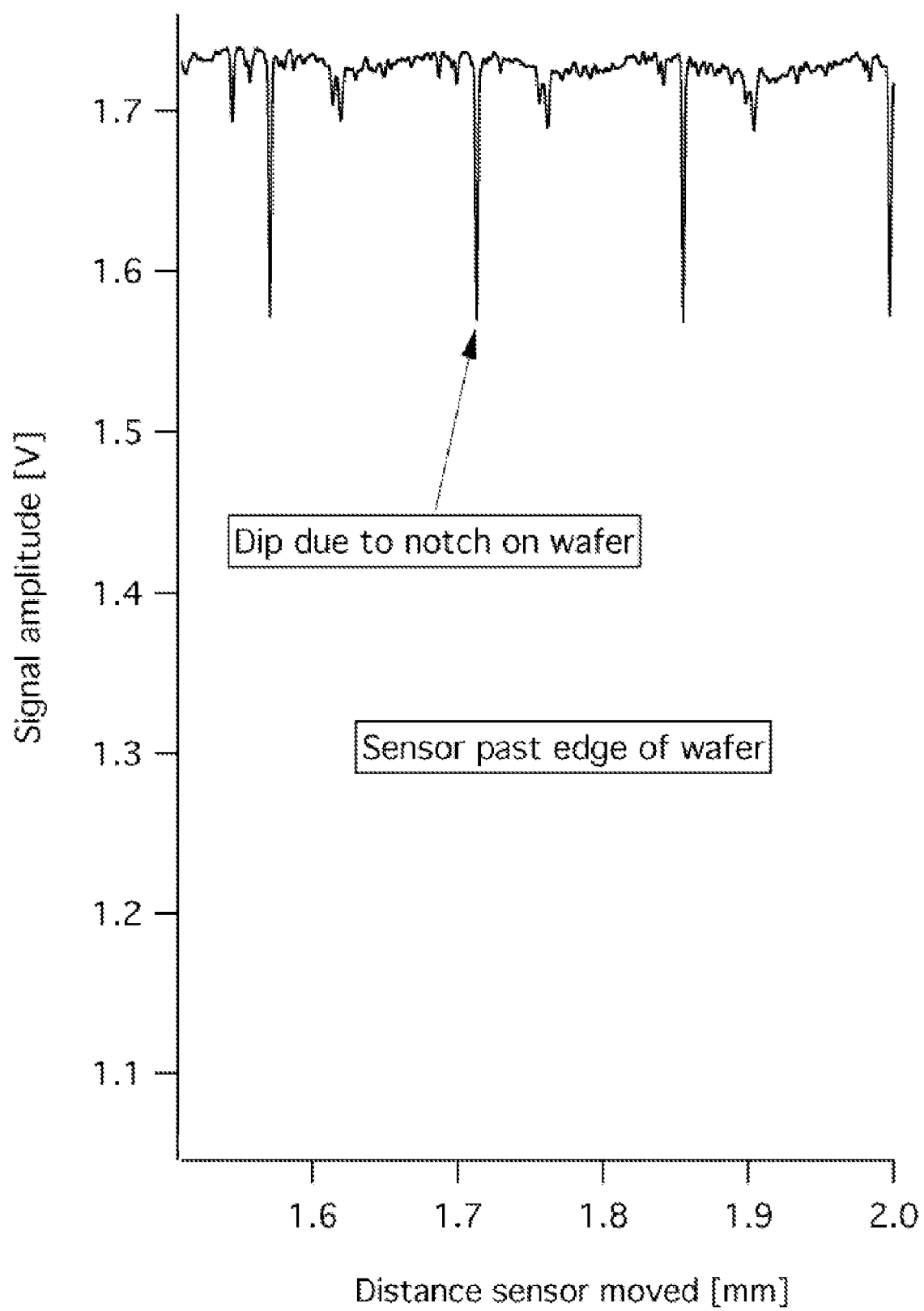
FIG. 6 is a second expanded portion of the data presented in FIG. 4.

At a sensor movement distance of about 1 mm, the detector is positioned at a radial position inside the wafer radius. Accordingly, the periodic decreases in signal observed between about 0.4 mm and about 0.8 mm, which result from the error in wafer concentricity, is significantly reduced. At a sensor movement distance of about 1 mm, the signal measured at the detector is substantially due to light reflecting off the top surface of the wafer. FIG. 6 is a second expanded portion of the data presented in FIG. 4. Referring to FIG. 6, the predominate signal results from light reflected off the top surface of the wafer, however, local dips in intensity are also observed.

The signal that is obtained when the wafer edge is blocking the light periodically decreases as light from the emitter passes through the notch and is then reflected off the spin cup. The reflection from the spin cup, in comparison with the reflection from the wafer surface, effectively results in a decrease in detected signal, as illustrated by the label "Dip due to notch on wafer" illustrated in FIG. 6. For sensor positions between about 1 mm and 2.5 mm, the detector is positioned over the optical edge bead removal (OEBR) portion of the wafer, exhibiting reflection from the wafer surface interrupted periodically by dips due to light passing through the notch.

As the sensor movement distance approaches about 2.7 mm, changes in the detected signal correlate with the detector moving over the patterned portion of the wafer. Light reflected from the top surface of the wafer is observed, with light reflected off the lower reflectance pattern resulting in periodic decreases in measured signal intensity. As described more fully below, analysis of the data illustrated in FIG. 4 may be used to detect wafer concentricity with respect to the spin axis of the wafer rotation assembly.

Embodiments of the present invention utilize the brief signal enhancement observed in FIG. 5 when the notch passes through the beam to ensure that the light being detected comes from below the wafer, not from the surface of the wafer. In many conventional systems, the notch signal is only used to determine wafer orientation or to obtain information related to the angular position of the wafer. One of the advantages provided by embodiments of the present invention is that the light passing through the notch after reflection from the spin cup provides a brief but strong signal when the beam is partially over the wafer, thereby allowing the software to determine the correct portion of the signal to analyze. As discussed in relation to FIG. 6, as the sensor moves inwards from its initial position and past the edge of the wafer, the light detected by the sensor results from light reflected from the top surface of the wafer. The use of the light passing through the notch provides an early indication of the wafer edge transition to allow proper analysis of the signal.

Embodiments of the present invention utilize small sections of the signal as the wafer passes to determine and control the linearity of the reflected light. Curve-fitting to these sections, in increments, then allows the full centering offset of the wafer to be obtained. In some conventional approaches, the signal around the full wafer is kept linear by providing a sensor both above and below the wafer. Here, the sensor is adapted to detect light reflected from below the wafer. The reflected light, which is non-linear in intensity is measured without the need of an additional receiver. Accordingly, by curve-fitting to a small portion of the reflected light signal, the curve is essentially linearized.

Signal analysis is performed in one of several manners to determine wafer concentricity. At least two signal analysis techniques are described herein. In a first technique, the translatable extension arm supporting the emitter/detector unit is moved under computer control in a feedback loop to maintain the detected signal at a constant level. The initial level of detected intensity is selected, in one embodiment such that the notch blip appears. In a second technique, a curve fit procedure is used on a small section of the signal, at a position where the wafer edge is moving inwards or outwards. Because the wafer is round, this portion of the signal will be substantially sinusoidal. By determining the magnitude of the motion of the arm at the next position, the amplitude of the signal can be converted to an absolute distance measurement, and the wafer position from center determined.

Figure 7:
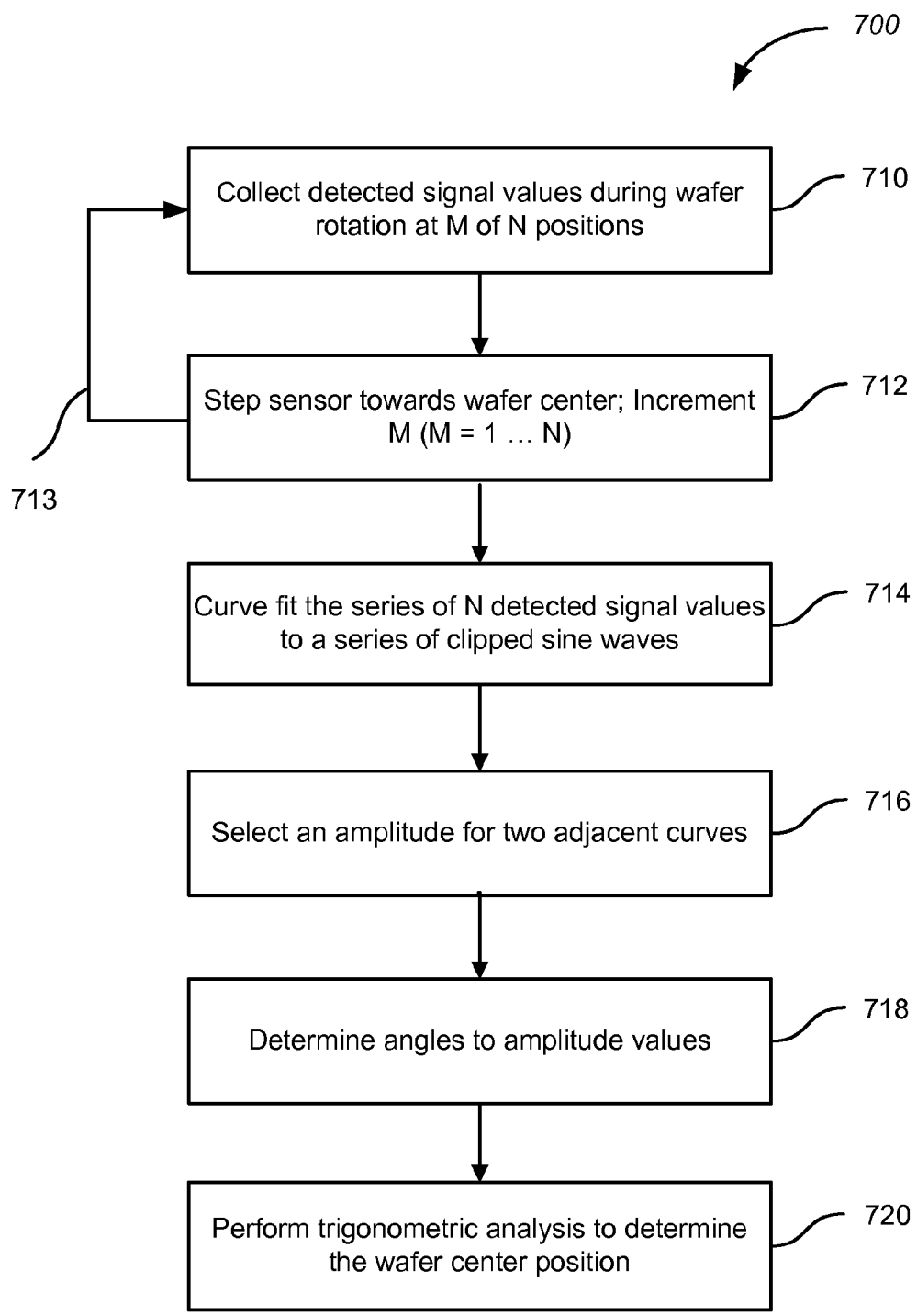
FIG. 7 is a simplified flowchart illustrating a method of determining wafer concentricity according to an embodiment of the present invention.

FIG. 7 is a simplified flowchart illustrating a method of determining wafer concentricity according to an embodiment of the present invention. This method is described merely as an example calculation and is not intended to limit the scope of embodiments of the present invention. The method includes collecting the signal from the sensor as the wafer rotates (710). Initially, the position of the translatable extension arm is set at one of N positions and data is collected during wafer rotation. Next, the sensor is stepped toward the center of the substrate by a first increment. Looping through steps 710 and 712 as shown by reference number 713, N measurements are made as M=1 . . . N. After measurements are made at N positions, the data is used in performing a curve fit (714) on the data collected in steps 710 and 712.

Figure 8:
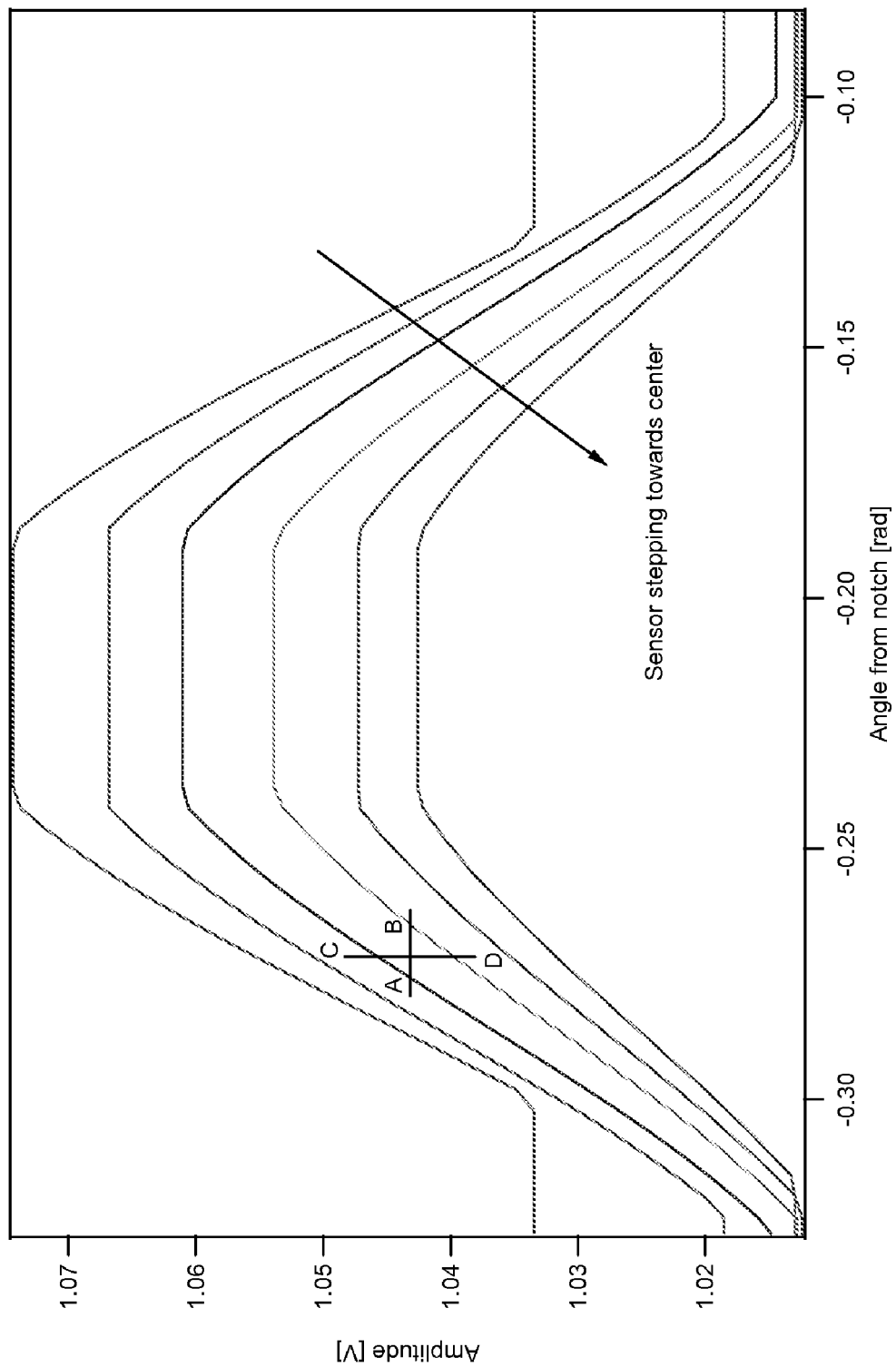
FIG. 8 shows examples of clipped sine waves fit to measured data for an off-center wafer.

Each of the N series of measured data values is fit to a clipped sine wave, providing the amplitudes and phase shift relative to the notch blip. Thus, for N sets of measured data (correlated with the sensor being positioned at N positions successively closer to the center of the substrate), N clipped sine curves are fitted. FIG. 8 shows examples of six clipped sine waves fit to measured data collected at six sensor positions for an off-center wafer. The locations of the same amplitude for adjacent fits gives the two angles where the amplitudes are the same, with a known stepped distance between the two. It will be apparent to one of skill in the art that measurements could be performed while stepping the sensor away from the center of the substrate. One of ordinary skill in the art would recognize many variations, modifications, and alternatives.

The data is fit to a clipped sine wave because, as the wafer rotates, light passes by the side of the wafer, increases sinusoidally as the sensor crosses the edge of the wafer, and then is reflected in a uniform manner (clipped portion of sine wave) while the sensor is over the wafer. As the sensor crosses the second edge region, light once again begins to pass by the side of the wafer. Accordingly, the center portion of the sine wave is clipped during data collection and the curve fitting process.

Two adjacent curves are selected, for example, the blue and green curves in FIG. 8 and a particular amplitude on each curve is selected (716). The selected amplitude of each curve is labeled as "A" and "B" in FIG. 8. The angle corresponding to the selected amplitude is read from the abscissa of the graph (718). These are the two angles at which, to a first order approximation, the wafer edge is in the same location relative to the axis of rotation.

A trigonometric analysis is performed of the angle and the known movement of the sensor from the blue to green curves to determine the location of the center of the wafer. A set of equations used in this analysis are discussed below. The radius difference, $r_1-r_2$ is obtained by calibrating the local sensitivity by the amplitude change as the sensor head moves, at the same angle, shown as points "C" and "D" in the FIG. 8.

Figure 9:
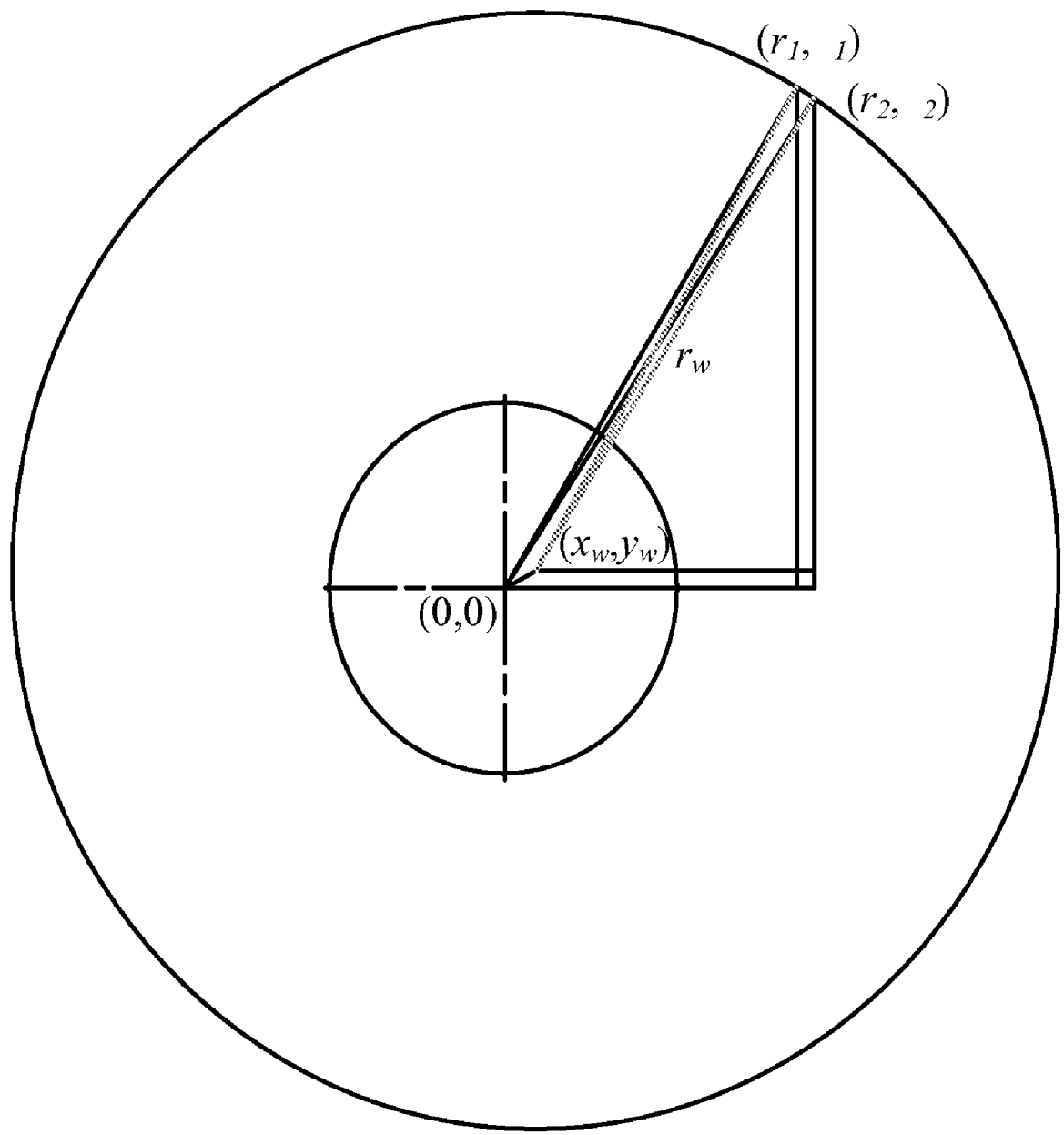
FIG. 9 illustrates a geometry used in performing a trigonometric analysis according to an embodiment of the present invention.

The trigonometric analysis described herein provides a method of determining the relative center of the wafer without requiring the use of a servo motor to move the sensor to keep the signal constant. FIG. 9 illustrates a geometry used in performing a trigonometric analysis according to an embodiment of the present invention. FIG. 9 illustrates a top view of the center of rotation, the off-center wafer, and the circle whose radius is equal to the distance from the sensor to the rotation axis, centered on that axis.

In performing the trigonometric analysis described herein, the following inputs are utilized: $\theta_1$, $\theta_1-\theta_2$, $r_1$, $r_1-r_2$ and the following outputs are produced: $x_w$, $y_w$. Referring to FIG. 9, the following geometric equations are applicable:

$$x_2 = r_2 \cos \theta_2 \quad (1)$$

$$x_1 = r_1 \cos \theta_1 \quad (2)$$

$$y_2 = r_2 \sin \theta_2 \quad (3)$$

$$y_1 = r_1 \sin \theta_1 \quad (4)$$

$$(x_2 - x_w)^2 + (y_2 - y_w)^2 = r_w \quad (5)$$

$$(x_1 - x_w)^2 + (y_1 - y_w)^2 = r_w \quad (6)$$

$$y_w = r_w \tan \theta_w \quad (7)$$

From the law of cosines:

$$(x_1 - x_w)^2 + (y_1 - y_w)^2 = \quad (8)$$
$$x_1^2 + x_w^2 + y_w^2 - 2x_1(x_w^2 + y_w^2)^{1/2} \cos\left(\theta_1 - \arctan\frac{y_w}{x_w}\right)$$

Combining equations (5) and (6), expanding, and simplifying results in:

$$2x_w(x_1-x_2)+2y_w(y_1-y_2) = x_1^2+y_1^2-x_2^2-y_2^2 \quad (9)$$

Combining equation (9) with equations (1) and (2) results in:

$$2x_w(r_1 \cos \theta_1 - r_2 \theta_2) + 2y_w(r_1 \sin \theta_1 - r_2 \sin \theta_2) = r_1^2 - r_2^2 \quad (10)$$

Given the inputs $\theta_1$, $\theta_1-\theta_2$, $r_1$, $r_1-r_2$, equations (8) and (10) are two equations with two unknowns: $x_w$ and $y_w$. These two equations can be solved iteratively due to their transcendental nature.

Referring once again to FIG. 7, it is not necessary that the position of the sensor be fixed during the measurement made in step 710. In alternative embodiments, the translatable extension arm is moved continuously during the measurement process and data is collected as the wafer rotates. A trigonometric computation is then performed in an analogous manner while taking the motion of the sensor during measurement into account. One of ordinary skill in the art would recognize many variations, modifications, and alternatives.

It should be noted that embodiments of the present invention are used to measure the concentricity of the substrate edge with respect to the spin chuck, not of the bevel with respect to the spin chuck. In some conventional processes, the bevel is detected and used to determine substrate concentricity. However, since the bevel is formed on the substrate in a grinding or comparable process, the bevel and the edge of the substrate are not necessarily concentric. Thus, embodiments of the present invention measure substrate concentricity with respect to the substrate edge.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A system for measuring substrate concentricity, the system comprising:
    a substrate support member adapted to rotate a substrate around a substantially vertical axis, the substrate comprising a mounting surface and a process surface;
    a spin cup positioned below the substrate;
    a translatable arm mounted a predetermined distance above the process surface of the substrate, wherein the translatable arm is adapted to translate along a radius of the substrate;
    an optical emitter mounted on the translatable arm; and
    an optical detector mounted on the translatable arm.

2. The system of claim 1 wherein the spin cup is characterized by a reflectance greater than about 50%.

3. The system of claim 1 wherein the predetermined distance is between about 3 mm and about 40 mm.

4. The system of claim 3 wherein the predetermined distance is about 22 mm.

5. The system of claim 1 wherein the optical emitter comprises a light emitting diode.

6. The system of claim 1 wherein the optical detector comprises a silicon detector.

7. The system of claim 1 wherein the optical emitter is oriented to direct an incident beam of optical radiation at a non-normal angle of incidence with respect to the process surface of the substrate.

8. A method of measuring substrate concentricity, the method comprising:
    placing the substrate on a substrate support positioned above a spin cup;
    rotating the substrate;
    directing an incident beam of optical radiation to impinge on a process surface of the substrate;
    detecting a first reflected beam, the first reflected beam being reflected off of the spin cup;
    detecting a second reflected beam, the second reflected beam being reflected off of the process surface of the substrate; and
    computing the substrate concentricity.

9. The method of claim 8 further comprising translating the incident beam of optical radiation along a radius of the substrate.

10. The method of claim 8 wherein directing an incident beam of optical radiation comprises directing the incident beam at a non-normal angle of incidence with respect to the process surface of the substrate.

11. The method of claim 8 wherein detecting a first reflected beam comprises detecting light passing through a notch of the substrate.

12. The method of claim 8 wherein detecting a second reflected beam comprises detecting light passing through a notch of the substrate.

13. A method of measuring substrate concentricity, the method comprising:
    a) rotating the substrate;
    b) providing a beam of incident light from an optical emitter;
    c) directing the beam of incident light at a process surface of the substrate;
    d) collecting a series of signal values at an optical detector;
    e) translating the optical emitter toward a center of the substrate;
    f) translating the optical detector toward the center of the substrate;
    g) repeating steps d) through f) a predetermined number of times to provide a set of the series of signal values;
    h) curve fitting the set of the series of signal values to a set of curves to provide a set of fitted curves;
    i) selecting an amplitude value associated with two of the set of fitted curves;
    j) performing an analysis to determine the substrate concentricity.

14. The method of claim 13 wherein the analysis comprises a trigonometric analysis.

15. The method of claim 13 wherein curve fitting the set of the series of signal values to a set of curves to provide a set of fitted curves is performed on a portion of the series of signal values.

16. The method of claim 13 wherein the set of curves comprises a set of clipped sine waves.

17. The method of claim 13 wherein the plurality of signal values comprise a first portion reflected from the spin cup and a second portion reflected from the process surface of the substrate.

18. The method of claim 13 wherein translating the optical emitter toward a center of the substrate and translating the optical detector toward the center of the substrate are performed concurrently.

* * * * *